(12) United States Patent
Svendsen et al.

(10) Patent No.: US 9,081,780 B2
(45) Date of Patent: ***Jul. 14, 2015

(54) SYSTEM AND METHOD FOR ASSIGNING USER PREFERENCE SETTINGS FOR A CATEGORY, AND IN PARTICULAR A MEDIA CATEGORY

(75) Inventors: Hugh Svendsen, Chapel Hill, NC (US); Waymen Askey, Cary, NC (US)

(73) Assignee: Abo Enterprises, LLC, Wilmington, DE (US)

( * ) Notice: Subject to any disclaimer, the term of this patent is extended or adjusted under 35 U.S.C. 154(b) by 638 days.

This patent is subject to a terminal disclaimer.

(21) Appl. No.: 13/076,912

(22) Filed: Mar. 31, 2011

(65) Prior Publication Data

US 2012/0041902 A1 Feb. 16, 2012

Related U.S. Application Data

(63) Continuation of application No. 11/696,475, filed on Apr. 4, 2007, now Pat. No. 7,941,764.

(51) Int. Cl.
*G06F 17/30* (2006.01)

(52) U.S. Cl.
CPC .... *G06F 17/30035* (2013.01); *G06F 17/30038* (2013.01); *G06F 17/30752* (2013.01); *G06F 17/30766* (2013.01); *G06F 17/30828* (2013.01); *Y10S 715/968* (2013.01); *Y10S 715/974* (2013.01)

(58) Field of Classification Search
CPC ................. G06F 17/30828; G06F 17/30752; G06F 17/30766; G06F 17/30035; G06F 17/30038

USPC ................................ 715/230, 833, 968, 974
See application file for complete search history.

(56) References Cited

U.S. PATENT DOCUMENTS

| | | | |
|---|---|---|---|
| 5,581,704 A | 12/1996 | Barbara et al. | |
| 5,616,876 A | 4/1997 | Cluts | |
| 5,706,435 A | 1/1998 | Barbara et al. | |

(Continued)

FOREIGN PATENT DOCUMENTS

| | | |
|---|---|---|
| CN | 1383328 A | 12/2002 |
| CN | 1841385 A | 10/2006 |

(Continued)

OTHER PUBLICATIONS

"Apple—iPod + iTunes," http://www.apple.com/itunes/, copyright 2007 Paramount Pictures, printed Feb. 7, 2007, 2 pages.

(Continued)

*Primary Examiner* — Cesar Paula
*Assistant Examiner* — Tyler J Schallhorn

(57) ABSTRACT

A system and method for assigning user preference settings for fields in a category using selected settings for only a subset of the media category fields is disclosed. A subset of fields for a media category is defined. A base setting for each field in the subset of the category fields is established. The base setting may be a weight or preference value. The base setting may be established by the user selecting a base setting or may be a default base setting. Once a user selects the settings for the subset of category fields, a set weight for the fields in the category not in the subset is determined using the base setting. That is possible because the fields in the subset of category fields are chosen from fields that contain aspects and attributes of the other fields.

31 Claims, 10 Drawing Sheets

$$W = W_m \times B$$

W = Set Weight of Field (10)
$W_m$ = Weighting Matrix
B = Base Settings
w = Weighting Coefficient

(56) References Cited

U.S. PATENT DOCUMENTS

| | | |
|---|---|---|
| 5,754,939 A | 5/1998 | Herz et al. |
| 5,758,347 A | 5/1998 | Lo et al. |
| 5,857,207 A | 1/1999 | Lo et al. |
| 5,870,764 A | 2/1999 | Lo et al. |
| 5,890,152 A | 3/1999 | Rapaport et al. |
| 5,918,223 A | 6/1999 | Blum et al. |
| 6,192,340 B1 | 2/2001 | Abecassis |
| 6,195,657 B1 | 2/2001 | Rucker et al. |
| 6,201,176 B1 | 3/2001 | Yourlo |
| 6,236,990 B1 | 5/2001 | Geller et al. |
| 6,438,579 B1 | 8/2002 | Hosken |
| 6,493,762 B1 | 12/2002 | Chen et al. |
| 6,498,955 B1 | 12/2002 | McCarthy et al. |
| 6,636,836 B1 | 10/2003 | Pyo |
| 6,657,116 B1 | 12/2003 | Gunnerson |
| 6,757,691 B1 | 6/2004 | Welsh et al. |
| 6,785,688 B2 | 8/2004 | Abajian et al. |
| 6,865,600 B1 | 3/2005 | Brydon et al. |
| 6,933,433 B1* | 8/2005 | Porteus et al. ............... 84/615 |
| 6,937,730 B1 | 8/2005 | Buxton |
| 6,941,324 B2 | 9/2005 | Plastina et al. |
| 7,000,188 B1 | 2/2006 | Eustace |
| 7,003,515 B1* | 2/2006 | Glaser et al. ................ 707/723 |
| 7,028,082 B1 | 4/2006 | Rosenberg et al. |
| 7,072,846 B1 | 7/2006 | Robinson |
| 7,075,000 B2 | 7/2006 | Gang et al. |
| 7,096,234 B2 | 8/2006 | Plastina et al. |
| 7,096,486 B1 | 8/2006 | Ukai et al. |
| 7,143,241 B2 | 11/2006 | Hull |
| 7,146,627 B1 | 12/2006 | Ismail et al. |
| 7,185,355 B1 | 2/2007 | Ellis et al. |
| 7,200,852 B1 | 4/2007 | Block |
| 7,233,948 B1 | 6/2007 | Shamoon et al. |
| 7,283,992 B2 | 10/2007 | Liu et al. |
| 7,296,285 B1 | 11/2007 | Jun et al. |
| 7,321,923 B1 | 1/2008 | Rosenberg et al. |
| 7,360,160 B2 | 4/2008 | Matz |
| 7,403,787 B2 | 7/2008 | Helferich |
| 7,496,623 B2 | 2/2009 | Szeto et al. |
| 7,504,576 B2 | 3/2009 | Georges |
| 7,529,743 B1 | 5/2009 | Ershov |
| 7,567,525 B2 | 7/2009 | Liao et al. |
| 7,570,943 B2 | 8/2009 | Sorvari et al. |
| 7,580,932 B2 | 8/2009 | Plastina et al. |
| 7,614,006 B2 | 11/2009 | Molander |
| 7,680,959 B2 | 3/2010 | Svendsen |
| 7,693,906 B1 | 4/2010 | Amidon et al. |
| 7,720,871 B2 | 5/2010 | Rogers et al. |
| 7,941,764 B2 | 5/2011 | Svendsen et al. |
| 8,005,841 B1 | 8/2011 | Walsh et al. |
| 8,059,646 B2 | 11/2011 | Svendsen et al. |
| 8,285,595 B2 | 10/2012 | Svendsen |
| 2001/0021914 A1 | 9/2001 | Jacobi et al. |
| 2001/0023401 A1 | 9/2001 | Weishut et al. |
| 2002/0002483 A1 | 1/2002 | Siegel et al. |
| 2002/0002899 A1* | 1/2002 | Gjerdingen et al. ........... 84/667 |
| 2002/0019858 A1 | 2/2002 | Kaiser et al. |
| 2002/0037083 A1 | 3/2002 | Weare et al. |
| 2002/0052873 A1 | 5/2002 | Delgado et al. |
| 2002/0073167 A1 | 6/2002 | Powell et al. |
| 2002/0082901 A1 | 6/2002 | Dunning et al. |
| 2002/0087565 A1 | 7/2002 | Hoekman et al. |
| 2002/0099697 A1 | 7/2002 | Jensen-Grey |
| 2002/0103796 A1 | 8/2002 | Hartley |
| 2002/0129168 A1 | 9/2002 | Kanai et al. |
| 2002/0138630 A1 | 9/2002 | Solomon et al. |
| 2002/0157096 A1 | 10/2002 | Hane et al. |
| 2002/0194285 A1 | 12/2002 | Mousseau et al. |
| 2002/0199194 A1 | 12/2002 | Ali |
| 2003/0005047 A1 | 1/2003 | Seki et al. |
| 2003/0014407 A1 | 1/2003 | Blatter et al. |
| 2003/0033347 A1 | 2/2003 | Bolle et al. |
| 2003/0045953 A1 | 3/2003 | Weare |
| 2003/0045954 A1 | 3/2003 | Weare et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0089218 A1 | 5/2003 | Gang et al. |
| 2003/0110503 A1 | 6/2003 | Perkes |
| 2003/0135513 A1 | 7/2003 | Quinn et al. |
| 2003/0140123 A1 | 7/2003 | Master et al. |
| 2003/0160770 A1 | 8/2003 | Zimmerman |
| 2003/0191753 A1 | 10/2003 | Hoch |
| 2003/0217055 A1 | 11/2003 | Lee et al. |
| 2003/0233241 A1 | 12/2003 | Marsh |
| 2003/0236582 A1 | 12/2003 | Zamir et al. |
| 2004/0019608 A1 | 1/2004 | Obrador |
| 2004/0023666 A1* | 2/2004 | Moon et al. ................ 455/456.1 |
| 2004/0030832 A1 | 2/2004 | Squibbs |
| 2004/0078383 A1 | 4/2004 | Mercer |
| 2004/0093466 A1 | 5/2004 | Hull |
| 2004/0128286 A1 | 7/2004 | Yasushi et al. |
| 2004/0139059 A1 | 7/2004 | Conroy et al. |
| 2004/0158870 A1 | 8/2004 | Paxton et al. |
| 2004/0160971 A1 | 8/2004 | Krause et al. |
| 2004/0254911 A1 | 12/2004 | Grasso et al. |
| 2005/0021420 A1 | 1/2005 | Michelitsch et al. |
| 2005/0038819 A1 | 2/2005 | Hicken et al. |
| 2005/0071221 A1 | 3/2005 | Selby |
| 2005/0076056 A1 | 4/2005 | Paalasmaa et al. |
| 2005/0108233 A1 | 5/2005 | Metsatahti et al. |
| 2005/0120053 A1 | 6/2005 | Watson |
| 2005/0158028 A1 | 7/2005 | Koba |
| 2005/0177516 A1 | 8/2005 | Vandewater et al. |
| 2005/0177568 A1 | 8/2005 | Diamond et al. |
| 2005/0187943 A1 | 8/2005 | Finke-Anlauff et al. |
| 2005/0192987 A1 | 9/2005 | Marsh |
| 2005/0197961 A1 | 9/2005 | Miller et al. |
| 2005/0234995 A1 | 10/2005 | Plastina et al. |
| 2005/0240661 A1 | 10/2005 | Heller et al. |
| 2005/0246740 A1 | 11/2005 | Teraci |
| 2005/0256756 A1 | 11/2005 | Lam et al. |
| 2005/0267944 A1 | 12/2005 | Little, II |
| 2005/0278364 A1 | 12/2005 | Kamen |
| 2005/0278758 A1 | 12/2005 | Bodlaender |
| 2005/0283791 A1 | 12/2005 | McCarthy et al. |
| 2006/0004923 A1 | 1/2006 | Cohen et al. |
| 2006/0008256 A1 | 1/2006 | Khedouri et al. |
| 2006/0010167 A1 | 1/2006 | Grace et al. |
| 2006/0020538 A1 | 1/2006 | Ram |
| 2006/0020662 A1 | 1/2006 | Robinson |
| 2006/0020962 A1 | 1/2006 | Stark et al. |
| 2006/0026048 A1 | 2/2006 | Kolawa et al. |
| 2006/0032363 A1 | 2/2006 | Platt |
| 2006/0064721 A1 | 3/2006 | Del Val et al. |
| 2006/0069769 A1 | 3/2006 | Dacosta |
| 2006/0083119 A1 | 4/2006 | Hayes |
| 2006/0100978 A1 | 5/2006 | Heller et al. |
| 2006/0112082 A1 | 5/2006 | Platt et al. |
| 2006/0117260 A1 | 6/2006 | Sloo et al. |
| 2006/0129544 A1 | 6/2006 | Yoon et al. |
| 2006/0143236 A1 | 6/2006 | Wu |
| 2006/0167991 A1 | 7/2006 | Heikes et al. |
| 2006/0173910 A1 | 8/2006 | McLaughlin |
| 2006/0195512 A1 | 8/2006 | Rogers et al. |
| 2006/0195514 A1 | 8/2006 | Rogers et al. |
| 2006/0195790 A1 | 8/2006 | Beaupre et al. |
| 2006/0218187 A1 | 9/2006 | Plastina et al. |
| 2006/0224435 A1 | 10/2006 | Male et al. |
| 2006/0230065 A1 | 10/2006 | Plastina et al. |
| 2006/0240868 A1 | 10/2006 | Kaplan et al. |
| 2006/0241901 A1 | 10/2006 | Hanus et al. |
| 2006/0242178 A1 | 10/2006 | Butterfield et al. |
| 2006/0242661 A1 | 10/2006 | Bodlaender et al. |
| 2006/0254409 A1 | 11/2006 | Withop |
| 2006/0271959 A1 | 11/2006 | Jacoby et al. |
| 2006/0277098 A1 | 12/2006 | Chung et al. |
| 2006/0288074 A1 | 12/2006 | Rosenberg |
| 2007/0005795 A1 | 1/2007 | Gonzalez |
| 2007/0011095 A1 | 1/2007 | Vilcauskas et al. |
| 2007/0011150 A1 | 1/2007 | Frank |
| 2007/0025194 A1 | 2/2007 | Morse et al. |

(56) References Cited

U.S. PATENT DOCUMENTS

| | | |
|---|---|---|
| 2007/0033419 A1 | 2/2007 | Kocher et al. |
| 2007/0053268 A1 | 3/2007 | Crandall et al. |
| 2007/0078832 A1 | 4/2007 | Ott, IV et al. |
| 2007/0078895 A1 | 4/2007 | Hsieh et al. |
| 2007/0089057 A1 | 4/2007 | Kindig |
| 2007/0094215 A1 | 4/2007 | Toms et al. |
| 2007/0118802 A1 | 5/2007 | Gerace et al. |
| 2007/0124325 A1 | 5/2007 | Moore et al. |
| 2007/0130207 A1 | 6/2007 | Pate et al. |
| 2007/0152502 A1 | 7/2007 | Kinsey et al. |
| 2007/0162502 A1 | 7/2007 | Thomas et al. |
| 2007/0169148 A1 | 7/2007 | Oddo et al. |
| 2007/0208802 A1 | 9/2007 | Barman et al. |
| 2007/0220100 A1 | 9/2007 | Rosenberg |
| 2007/0255797 A1 | 11/2007 | Dunn et al. |
| 2007/0265979 A1 | 11/2007 | Hangartner |
| 2007/0266049 A1 | 11/2007 | Cohen et al. |
| 2007/0266402 A1 | 11/2007 | Pawlak et al. |
| 2007/0271287 A1 | 11/2007 | Acharya et al. |
| 2007/0282472 A1 | 12/2007 | Seldman |
| 2007/0288546 A1 | 12/2007 | Rosenberg |
| 2008/0005301 A1 | 1/2008 | Li et al. |
| 2008/0016205 A1 | 1/2008 | Svendsen |
| 2008/0040474 A1 | 2/2008 | Zuckerberg et al. |
| 2008/0052371 A1 | 2/2008 | Partovi et al. |
| 2008/0059422 A1 | 3/2008 | Tenni et al. |
| 2008/0059576 A1 | 3/2008 | Liu et al. |
| 2008/0062318 A1 | 3/2008 | Ellis et al. |
| 2008/0091771 A1 | 4/2008 | Allen et al. |
| 2008/0126191 A1 | 5/2008 | Schiavi |
| 2008/0133601 A1 | 6/2008 | Martin Cervera et al. |
| 2008/0134039 A1 | 6/2008 | Fischer et al. |
| 2008/0134053 A1 | 6/2008 | Fischer |
| 2008/0140717 A1 | 6/2008 | Rosenberg et al. |
| 2008/0141315 A1 | 6/2008 | Ogilvie |
| 2008/0147482 A1 | 6/2008 | Messing et al. |
| 2008/0147711 A1 | 6/2008 | Spiegelman et al. |
| 2008/0189295 A1 | 8/2008 | Khedouri et al. |
| 2008/0195657 A1 | 8/2008 | Naaman et al. |
| 2008/0201446 A1 | 8/2008 | Svendsen |
| 2008/0208823 A1 | 8/2008 | Hicken |
| 2008/0209482 A1 | 8/2008 | Meek et al. |
| 2008/0222546 A1 | 9/2008 | Mudd et al. |
| 2008/0243733 A1 | 10/2008 | Black |
| 2009/0055396 A1 | 2/2009 | Svendsen et al. |
| 2009/0055759 A1 | 2/2009 | Svendsen |
| 2009/0076881 A1 | 3/2009 | Svendsen |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0129671 A1 | 5/2009 | Hu et al. |
| 2009/0144325 A1 | 6/2009 | Chastagnol et al. |
| 2009/0144326 A1 | 6/2009 | Chastagnol et al. |
| 2009/0254572 A1 | 10/2009 | Redlich et al. |
| 2010/0005116 A1 | 1/2010 | Yoon et al. |
| 2010/0063975 A1 | 3/2010 | Hayes |

FOREIGN PATENT DOCUMENTS

| | | |
|---|---|---|
| EP | 1686497 A2 | 8/2006 |
| EP | 1791130 A2 | 5/2007 |
| JP | 2005321668 A | 11/2005 |
| WO | 01/77907 A2 | 10/2001 |
| WO | 01/84353 A2 | 11/2001 |
| WO | 02/21335 A1 | 3/2002 |
| WO | 03/019560 A2 | 3/2003 |
| WO | 2004/017178 A2 | 2/2004 |
| WO | 2005/038666 A1 | 4/2005 |
| WO | 2005/052814 A1 | 6/2005 |
| WO | 2006/075032 A1 | 7/2006 |
| WO | 2006/126135 A2 | 11/2006 |
| WO | 2007/032003 A2 | 3/2007 |
| WO | 2007/044389 A2 | 4/2007 |
| WO | 2007/092781 A2 | 8/2007 |

OTHER PUBLICATIONS

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Goombah—Preview," http://www.goombah.com/preview.html, printed Jan. 8, 2008, 5 pages.

"Apple—iPod classic," http://www.apple.com/ipodclassic/, printed Oct. 26, 2007, 1 page.

"MyStrands Download," http://www.mystrands.com/overview.vm, copyright 2003-2007 MediaStrands, Inc., printed Feb. 7, 2007, 3 pages.

"Welcome to Facebook!—Facebook," http://www.facebook.com/, copyright 2008 Facebook, printed Jan. 9, 2008, 1 page.

Joe Lamantia, "Second Generation Tag Clouds," copyright 2006 Joe Lamantia, available from http://www.joelamantia.com/blog/archives/ideas/second_generation_ . . . , printed Nov. 29, 2007, 19 pages.

"AOL Music Now," http://web.archive.org/web/20060508184531/aol.musicnow.com/az/home.jhtml?_requesti . . . , copyright 2006 AOL Music Now LLC, printed Nov. 16, 2007, 1 page.

"Motorola Phones Tools—Features—Motorola US," http://direct.motorola.com/ens/MPT/MPT_Feature.asp, copyright 2005-2007 Motorola inc., printed Nov. 16, 2007, 1 page.

"Rhapsody—Full-length music, videos and more—Free," http://www.rhapsody.com/welcome.html, copyright 1948-2007 Muze Inc., printed Feb. 7, 2007, 1 page.

"Developer News Archive," Audacity Wiki, retrieved Jun. 4, 2009 from http://audacityteam.org/wiki/index.php?title=Developer_News_Archive, 10 pages.

Steven Holzner, "Inside JavaScript," copyright 2009 Safari Books Online, 7 pages.

Owen Kaser et al., "Tag-Cloud Drawing: Algorithms for Cloud Visualization," available from http://www2007.org/workshops/paper_12.pdf, 10 pages.

Hill et al., "Recommending and Evaluating Choices in a Virtual Community of Use," http://delivery.acm.org/10.1145/230000/223929/p1. . .1=GUIDE&dl=GUIDE&CFID=101371626&CFTOKEN=47493911, 1995, 15 pages.

Pouwelse et al., "P2P-based PVR Recommendation using Friends, Taste Buddies and Superpeers," Workshop: Beyond Personalization 2005, Jan. 9, 2005, 6 pages.

Xiong et al., "PeerTrust: Supporting Reputation-Based Trust for Peer-to-Peer Electronic Communities," IEEE Transaction on Knowledge and Date Engineering, vol. 6, No. 7, Jul. 2004, copyright 2004 IEEE, 15 pages.

Abstract, Chinese Patent Publication No. 1383328A, published Dec. 4, 2002, "Method and System for Recommending Program," Chinese Patent Application No. 20021018177, filed Apr. 23, 2002, Applicant: NEC Corp, Inventors: Hidegi Hane and Shinichiro Kamei, obtained from http://www.espacenet.com, as the abstract to related US Patent Application Publication No. 2002/0157096 A1, 2 pages.

Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Taken Miyajima Yasushi Yamashi, obtained from http://www.espacenet.com, 1 page.

Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.

"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.

"Identifying iPod models," at <http://support.apple.com/kb/HT1353>, page last modified Jan. 15, 2010, includes information dating back to 2001, printed Feb. 24, 2010, 13 pages.

(56) References Cited

OTHER PUBLICATIONS

Kristen Nicole, "YouTube Remixer—Online Video Editing for YouTube," at <http://mashable.com/2007/06/16/youtube-remixer/>, dated Jun. 16, 2007, including a post that appears to be posted 2 years prior to Jun. 16, 2007 (Jun. 2005), printed Jan. 8, 2010, 4 pages.

Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.

"musicstrands.com—Because Music is Social," brochure, copyright 2006, MusicStrands, Inc., 2 pages.

"MyStrands Labs: Patent-pending Technologies," at <http://labs.mystrands.com/patents.html>, printed Feb. 7, 2007, 5 pages.

"Pandora Internet Radio—Find New Music, Listen to Free Web Radio," at <http://www.pandora.com/>, copyright 2005-2007, Pandora Media, Inc., printed Feb. 7, 2007, 1 page.

"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.

"Press Release: UGC Whitepaper released—eModeration," Feb. 22, 2007, at <http://www.emoderation.com/news/press-release-ugc-whitepaper-released>, copyright 2006-2009, eModeration, printed Apr. 28, 2009, 3 pages.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestream%20review%20of%20personalization&source=web&cd=1&ved=0CDcQFjAA&url=http%3A%2F%2Fwww.behavioraltargeting.info%2Fdownload attachment.php%3Fald%3Dcf74d490a8b97edd535b4ccdbfd0df 55%26articleId%3D31&ei=C2jeTr71AurZ0QGCgsGvBw& usg=...>, 13 pages.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

Abstract, Japanese Patent Publication No. 2005-321668, published Nov. 17, 2005, "Device and method for processing information, and program," Japanese Patent Application No. 2004-140602, filed May 11, 2004, Applicant: Sony Corp, Inventor: Kobayashi Yoshiyuki, obtained from the Patent Abstracts of Japan (PAJ), 1 page.

\* cited by examiner $$
\begin{bmatrix} \text{Metal} \\ \text{Pop} \\ \text{Rap} \\ \text{Reggae} \\ \text{Industrial} \\ \text{Ska} \\ \text{Grunge} \\ \text{Oldies} \\ \text{Punk} \\ \text{Gospel} \\ \text{Ambient} \\ \text{Eurodance} \\ \text{Trance} \\ \text{Jungle} \\ \text{Noise} \\ \text{Top 40} \end{bmatrix} = \begin{bmatrix} w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \\ w & w & w & w & w & w & w & w \end{bmatrix} \times \begin{bmatrix} \text{Rock} \\ \text{Classical} \\ \text{Folk} \\ \text{Techno} \\ \text{Country} \\ \text{Alternative} \\ \text{Jazz} \\ \text{Funk} \end{bmatrix}
$$

$$W = W_m \times B$$

W = Set Weight of Field (10)
$W_m$ = Weighting Matrix
B = Base Settings
w = Weighting Coefficient

| title | artist | genre | decade | availability | score |
|---|---|---|---|---|---|
| sweet emotion | aerosmith | rock | 1970s | local | 95 |
| so what | miles davis | jazz | 1960s | find | 94 |
| dance in my sleep | dave adams | alternative | 1980s | subscription network | 92 |
| come away with me | norah jones | jazz | 2000s | subscription network | 88 |
| walk the line | johnny cash | country | 1970s | buy/download | 86 |
| say hey | the tubes | alternative | 1980s | local | 86 |
| you get what you give | new radicals | alternative | 1990s | local | 83 |
| tenderness | general public | new wave | 1980s | local | 83 |
| running with the devil | van halen | rock | 1970s | local | 82 |
| rebel yell | billy idol | punk | 1980s | subscription network | 81 |
| beautiful day | u2 | rock | 2000s | local | 79 |
| still lovin you | scorpions | metal | 1980s | subscription network | 76 |
| true | spandau ballet | dance | 1980s | subscription network | 72 |
| heart of the night | poco | rock | 1970s | subscription network | 67 |
| roundabout | yes | rock | 1970s | buy/download | 67 |
| alison | elvis costello | alternative | 1980s | buy/download | 65 |
| run to the hills | iron maiden | metal | 1970s | local | 64 |
| hound dog | elvis presley | rock | 1980s | buy/download | 55 |
| something more | sugarland | country | 2000s | subscription network | 25 |

CURRENT SONG
CURRENT ALBUM

USER: HUGH

SYSTEM AND METHOD FOR ASSIGNING USER PREFERENCE SETTINGS FOR A CATEGORY, AND IN PARTICULAR A MEDIA CATEGORY

CROSS REFERENCE TO RELATED APPLICATIONS

This patent application is a Continuation of U.S. patent application Ser. No. 11/696,475, filed Apr. 4, 2007, entitled "SYSTEM AND METHOD FOR ASSIGNING USER PREFERENCE SETTINGS FOR A CATEGORY, AND IN PARTICULAR A MEDIA CATEGORY," the disclosure of which is hereby incorporated herein by reference in its entirety.

FIELD OF THE INVENTION

The present invention is a system and method for assigning user preference settings for fields in a category, and particularly a media category, using selected settings for only a subset of the category fields.

BACKGROUND OF THE INVENTION

In recent years, there has been an enormous increase in the amount of digital media available online. Services, such as Apple's iTunes® for example, enable users to legally purchase and download music. Other services, such as Yahoo!® Music Unlimited and RealNetwork's Rhapsody® for example, provide access to millions of songs for a monthly subscription fee. YouTube® provides users access to video media. As a result, media items have become much more accessible to consumers worldwide. However, the increased accessibility of media has only heightened a long-standing problem for the media industry, which is namely the issue of linking users with media that matches their preferences.

Many companies, technologies, and approaches have emerged to address this issue. Being able to link users with media that match their preferences allows companies to effectively make recommendations of media items to users. Some companies assign ratings to attributes of identified media. The ratings are assembled to create a holistic classification for the media that is then used by a recommendation engine to produce recommendations. Other companies take a communal approach wherein recommendations are based on the collective wisdom of a group of users with similar tastes by profiling the habits of a particular user based on the information provided by the user and then searching similar profiles of other users. Either approach involves the soliciting, assembling and reviewing of information about a user and/or the user's media likes or dislikes. That information then is used to establish user preferences on which to base media recommendations.

In some recommendation generation schemes, the user's media preferences are used to determine recommendations. User preferences allow more accurate targeting of recommendations. A user may establish his preferences by assigning a weight to different media categories. These media categories may include, for example, genre, artist, title, album or presentation, date of release, or the like. The weight assigned by the user for each of the media categories is used to define the user's preferences, and from those preferences, a profile for that user. One example of such an approach is described in U.S. patent application Ser. No. 11/484,130, entitled "P2P NETWORK FOR PROVIDING REAL TIME MEDIA RECOMMENDATIONS," filed on Jul. 11, 2006, which is hereby incorporated herein by reference in its entirety.

Media categories may however contain a large number of fields. To effectively assign a weight to a media category, the user must assign a weight to each of the fields within that media category. This may be a difficult and time consuming effort for the user depending on the number of fields in a media category. The genre media category provides a pertinent example of this problem.

Genre may be considered the predominant media category for determining a user's preferences. The genre category is generally recognized as comprising up to one hundred and forty-eight (148) different fields. Users may not spend, and in most cases, will not spend the time to assign 148 different weights to these fields. Alternatively, the user may opt to just assign weights to only certain selected fields of interest. In either scenario, the weighting of the genre media category would be incomplete. As a result, preferences calculated using the incomplete weighting of a media category would be inherently inaccurate. Therefore, any media item recommendation based on those preferences would be inaccurate. Accordingly, there is a need for a system and method to effectively assign preference weights to a set of fields within a media category, and particularly the genre media category, without the user having to individually assign a weight to each field within that media category.

SUMMARY OF THE INVENTION

The present invention is a system and method for assigning user preference settings for fields in a category using selected settings for only a subset of the category fields. A subset of fields for a category is defined. A base setting for each field in the subset of the category fields is established. The base setting may be set by the user selecting a base setting or by a default base setting. Once a user selects the base settings for the subset of category fields, a set weight is determined for the fields in the category not in the subset. That is possible because the fields in the subset of category fields are chosen from fields that contain aspects and attributes of the other fields.

In one embodiment, a weighting coefficient corresponding to each field in the subset is determined. For example, with respect to a media category in particular, if there are eight fields in the subset of the media categories, each field in the media category may have eight different weighting coefficients. A weighting calculation may be used to determine the set weight. The weighting calculation using the base setting and the weighting coefficient is used to calculate the individual weights for each of the fields in the media category. Calculating the weight for a field using the weighting calculation involves multiplying the weighting coefficient for that field by the base setting for each field in the subset. The weighting coefficients initially may be determined from the user's existing profile or play history. Subsequently, the weighting coefficients may be adjusted based on the user's preferences and continued play history.

The weights for the fields may be used to score media items. The user may use the score of the media items to filter received recommendations of media items, send recommendations of media items to others, select media items to play, develop and sort play lists of media items, purchase media items from subscription services, and the like.

The fields in the subset may be displayed on a base setting screen graphic user interface (GUI). The base settings screen GUI displays the field and the base setting established for the field. The base setting may be a weight or preference value. It should be understood that for the purposes of describing the present invention, the terms "weight" and "preference value" have the same meaning and may be used interchangeably. Each field in the subset may have a base setting selector actionable by the user to select a base setting for that field. The base setting selector may be a sliding bar with a range of 0 to 10. The user may select the base setting for one or more fields displayed on the base settings screen GUI by adjusting the base setting selector for that field. The base settings screen GUI also includes a base settings "Done" button. Once the user has selected the base setting for a field, or if the user chooses to not select a base setting for any field, the user actuates the base settings "Done" button. The actuation of the base settings "Done" button indicates that the user has completed the base setting selection process and initiated the determination of the weights for one or more of the fields in the media category not in the subset 14 using the weighting calculation based on weighting coefficients and the base settings. The weights calculated are stored and designated as an advanced setting for each of the fields.

In another embodiment, the user may elect to customize one or more fields by assigning the weight for the one or more fields as the advanced setting. In such a case, the weight assigned by the user for the one or more fields as the advanced setting applies and the weight determined using the weighting calculation based on the base settings of the fields in the subset does not apply. As such, the base settings of the fields in the subset do not affect the weight of the field assigned as the advanced setting. The weight determined using the weighting calculation based on the base settings of the fields in the subset continues to apply on the fields on which the user did not assign the weight.

The base settings screen GUI may include an "Advanced" button. Upon the user actuating the "Advanced" button an advanced settings screen GUI is presented to the user. The advanced settings screen GUI displays all of the fields that are in the media category and the advanced setting established for the field. Each field has a weight displayed as the advanced setting. The weights shown as the advanced settings are the weights determined using the weighting calculation based on the base settings for the fields in the subset. Each field has an advanced setting selector. The advanced setting selector may be a sliding bar with a range of 0 to 10. The user may customize the weight of the field by assigning the weight for a field on the advanced setting screen GUI by adjusting the advanced setting selector for that field. The field for which the user assigns a weight using the advanced setting selector may appear different than the field for which the user did not assign a weight using the advanced setting selector. In this manner, the user may be able to determine which fields have weights that were assigned and which fields have weights that were determined from the base settings.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 5 illustrates the weighting calculation for calculating the weights using weighting coefficients and the base settings;

Figure 9:
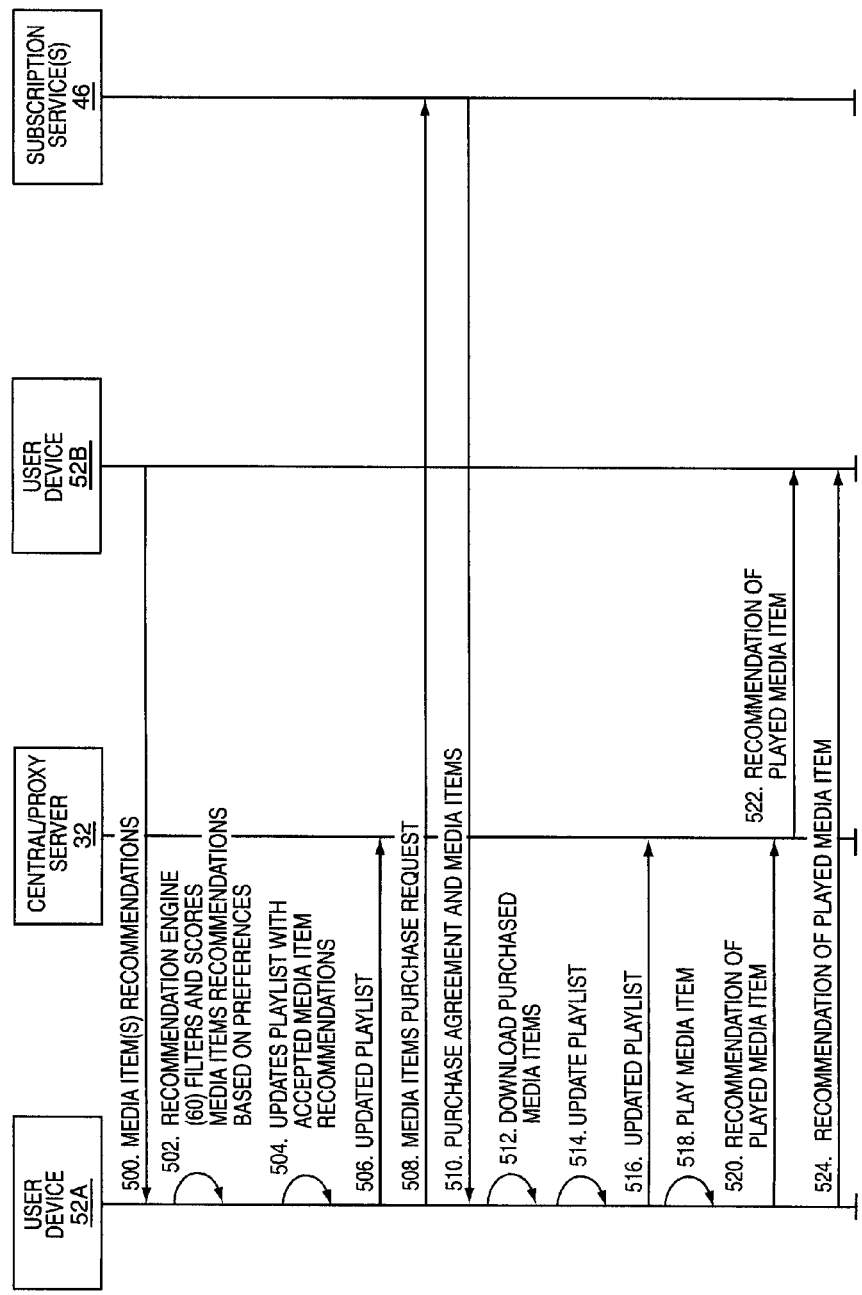

FIG. 9 illustrates an exemplary communication flow diagram between a user device A, the central/proxy server, a user device B and the subscription services, wherein media items are determined and recommendations are filtered based on the score resulting from the weights; and FIG. 10 illustrates an exemplary GUI showing a playlist, wherein the recommendation scores for media items based on the weights of genre media fields and other media categories are displayed to the user.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a system and method for assigning user preference settings for fields in a category using selected settings for only a subset of the category fields. A subset of fields for a category is defined. A base setting for each field in the subset of the category fields is established. The base setting may be set by the user selecting a base setting or by a default base setting. Once a user selects the settings for the subset of category fields, a set weight is determined for the fields in the category not in the subset. That is possible because the fields in the subset of category fields are chosen from fields that contain aspects and attributes of the other fields. Weights for different media categories, for example, genre, artist, title, album, date of release, or the like, may be used to score or rate media items and score and filter media item recommendations. The user's preferences for the different media categories are used to develop a profile for the user. An approach to determining and utilizing user preferences for media categories and the user profile is described in co-pending and previously incorporated U.S. patent application Ser. No. 11/484,130, entitled "P2P NETWORK FOR PROVIDING REAL TIME MEDIA RECOMMENDATIONS."

Figure 1:
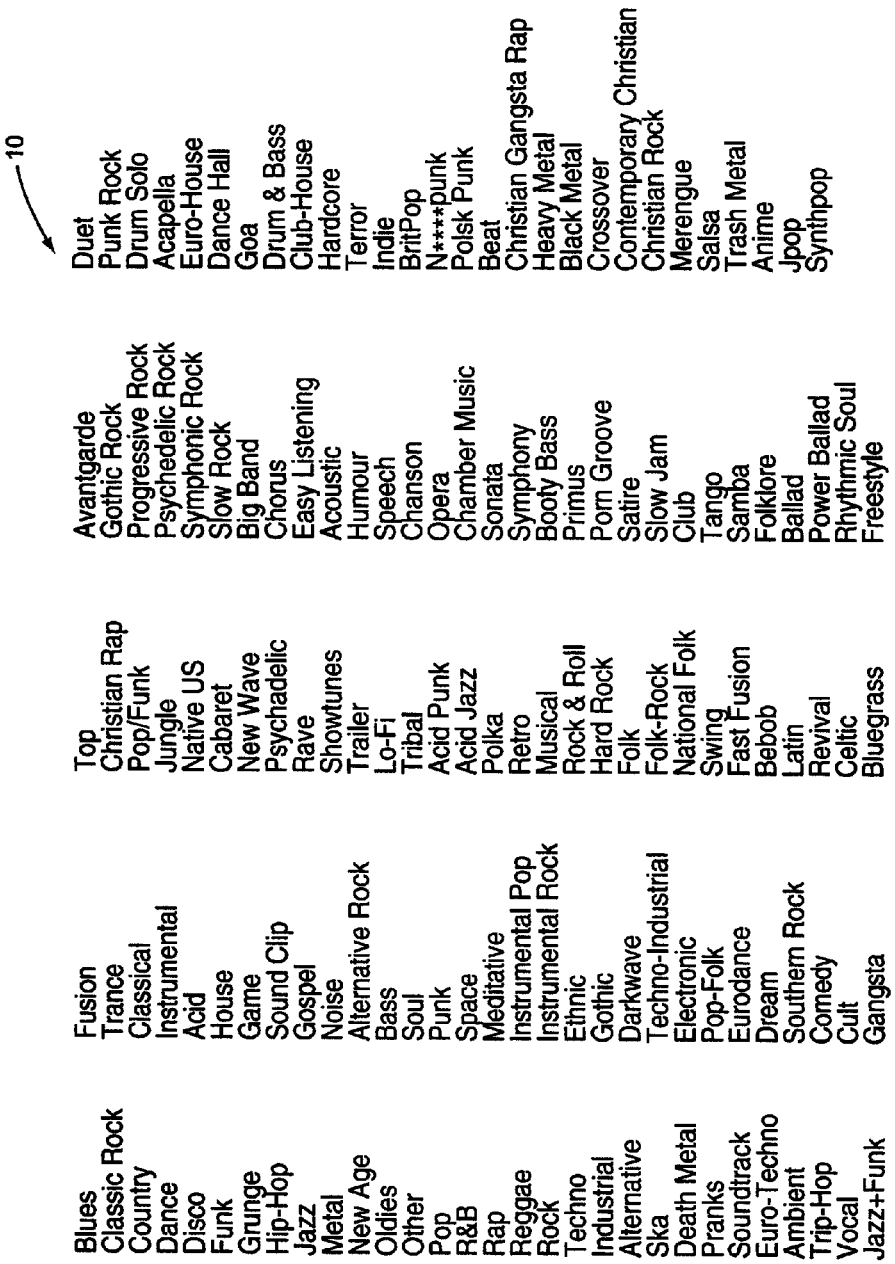
FIG. 1 illustrates an exemplary list of fields for a genre media category.

As background, a media category typically contains multiple fields. For example, WinAmp®, the proprietary media player written by Nullsoft, a subsidiary of Time Warner, Inc., currently identifies one hundred and forty-eight (148) different fields in the music genre category as one example of a media category. FIG. 1 shows a list of these one hundred and forty-eight (148) different genre fields 10. Each genre field 10 contains attributes and aspects. These attributes and aspects may be melody, harmony, beat, instrumentation, lyrics, orchestration, vocal character, and the like, for example. Genre fields may have attributes and aspects that are present in other genre fields. For example, the Folk-Rock field will have attributes and aspects associated with the Rock field as will the Techno field, Industrial field and Death Metal field, to name just a few. The attributes and aspects of some genre fields may actually be present in most of the other fields. As such, these genre fields may be viewed as base fields, meaning that they contain attributes and aspects that will have a highest presence or prevalence in the largest number of other fields. The aforementioned Rock field may be one of these fields, as well as the Country field, Folk field and a few others. Because of the prevalence of the attributes and aspects of the base genre fields 10 in the other fields in the genre media category, a preference setting of a base field can be used to calculate the weights of the other fields.

Please note that although the present invention is described by example with reference to media categories, it should be understood that the present invention applies to any type of category, and accordingly, the present invention should not limited to media categories.

Figure 2:
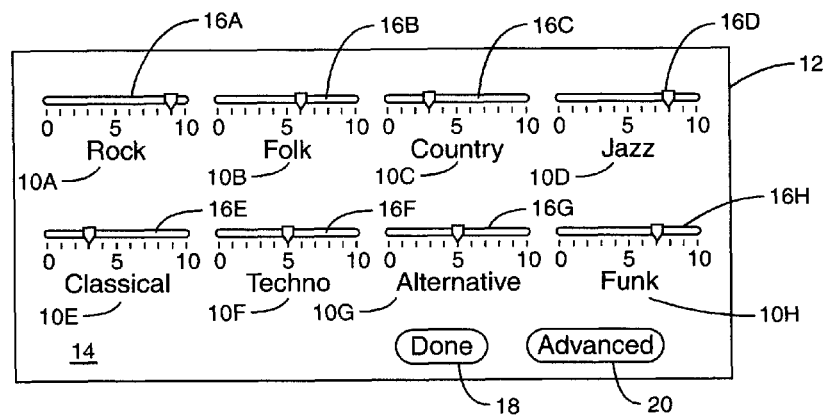
FIG. 2 illustrates an exemplary graphic user interface (GUI) of the base setting screen displaying a subset of fields for the genre media category.

FIG. 2 illustrates an exemplary media category subset base settings screen graphic user interface (GUI) 12 of a media application that may be used in an embodiment of the present invention to assign preference values to all fields in a genre media category. The base setting may be a weight or preference value. It should be understood that for the purposes of describing the present invention, the terms "weight" and "preference value" have the same meaning and may be used interchangeably. A subset 14 of genre fields 10 is presented on the base settings screen GUI 12. In FIG. 2, eight genre fields 10A, 10B, 10C, 10D, 10E, 10F, 10G, 10H are included in the subset 14. The number of genre fields 10 in the subset 14 is shown for exemplary purposes and, accordingly, may vary without departing from the scope and concept of the present invention. Each genre field 10 in the subset 14 has a base setting selector 16, namely base setting selectors 16A, 16B, 16C, 16D, 16E, 16F, 16G, 16H. The base setting selector 16 shown in FIG. 2 is a sliding bar allowing the user to select a base setting of 0 to 10 with 5 being a midpoint. The base setting selector 16 may be any mechanism allowing the user to select a base setting for the genre fields 10 in the subset 14. All base setting selectors 16 are initially set to the midpoint of '5'. If the user does not select a base setting for a field in the subset 14, that base setting remains at '5' as a default base setting.

For example, in FIG. 2, the user has selected base settings for certain of the fields. The user's selections include: Rock 10A set to '9' using base setting selector 16A; Folk 10B set to '6' using base setting selector 16B; Country 10C set to '3' using base setting selector 16C; Jazz 10D set to '8' using base setting selector 16D; Classical 10E set to '3' using base setting selector 16E; and Funk 10H set to '7' using base setting selector 18H. In the example, the user did not select any base setting for Techno 10F and Alternative 10G. Accordingly, base selectors 16F and 16G retained the initial base setting of '5' as a default base setting.

The base settings screen GUI 12 includes a base settings 'Done' button 18. Once the user has completed the selection of the base settings using the base setting selectors 16, the user actuates the base settings 'Done' button 18. Upon actuation of the base settings 'Done' button 18, the base settings for the genre fields 10 in the subset 14, whether selected or default, are used to determine the weights of one or more of the genre fields 10 in the genre media category not in the subset 14. As further described below, a weighting calculation may be employed to determine the weights for all the genre media category fields. Actuating the base settings 'Done' button 18 initiates the weighting calculation. In the weighting calculation, the base settings for each field in the subset 14 are multiplied by weighting coefficients for each field in the genre media category to provide a weight for that genre field 10 which is stored as an advanced setting.

Note that other means besides, and/or in addition to, a weighting calculation may be used to determine the weights of the category fields. For example, heuristic methods or processes may be used to determine the weights of the category fields from the base settings. It should be understood that the present invention is not limited to using a weighting calculation.

Figure 3:
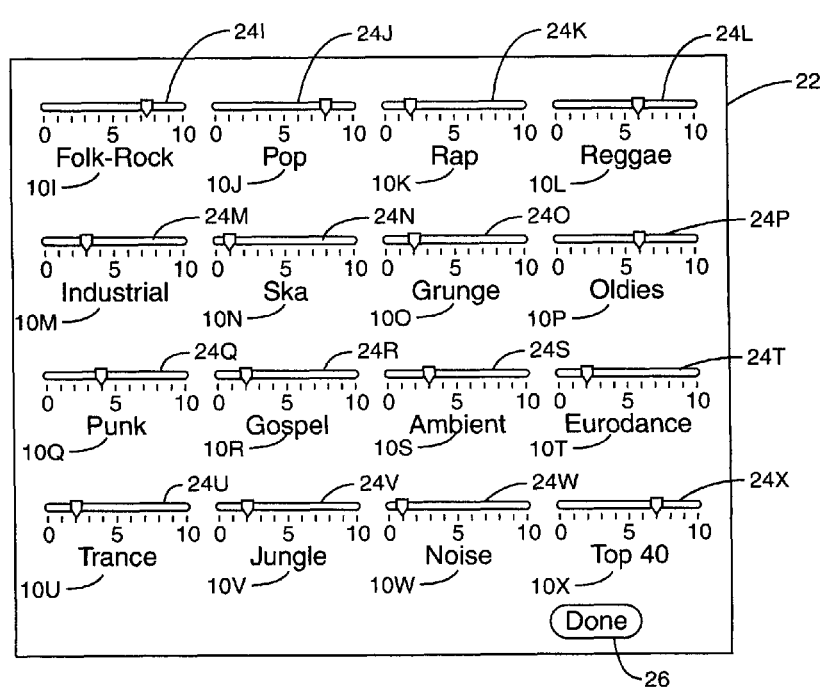
FIG. 3 illustrates an exemplary GUI of the advanced setting screen displaying an exemplary portion of the fields in the genre media category.

The base settings screen GUI 12 also includes an 'Advanced' button 20. Instead of actuating the base settings 'Done' button 18, optionally, the user may actuate the 'Advanced' button 20. Actuating the 'Advanced' button 20 causes an advanced settings screen GUI 22 to open, an example of which is illustrated in FIG. 3. Actuating the 'Advanced' button 20 initiates the weighting calculation and allows the user to bypass selecting a base setting for the subset of genre fields 10 and assign a weight to each genre field 10 individually in the media category.

As illustrated in FIG. 3, all of the genre fields 10 within the genre media category are displayed on the advanced settings screen GUI 22. For exemplary and ease of explanation purposes, only sixteen of the one hundred forty-eight (148) genre fields, namely genre fields 10I, 10J, 10K, 10L, 10M, 10N, 10O, 10P, 10Q, 10R, 10S, 10T, 10U, 10V, 10W, 10X are displayed. The advanced settings screen GUI 22 could display all one hundred and forty-eight (148) genre fields 10.

If the user has not previously assigned an advanced setting for a genre field 10, the advanced settings shown for each genre field 10 will be assigned the weights calculated by the weighting calculation using the base settings from the base settings screen GUI 12, as discussed above with respect to FIG. 2. Accordingly, upon initially opening the advance settings screen GUI 22, each genre field 10 will display an advanced setting, as shown on FIG. 3. For example, the Folk-Rock field 10I shows the sliding bar half way between 7 and 8 for an advanced setting of '7.5', which is the weight calculated by the weighting calculation for that genre field 10.

Each genre field 10 displayed on the advanced settings screen GUI 22 has an advanced setting selector 24, namely advanced setting selectors 24I, 24J, 24K, 24L, 24M, 24N, 24O, 24P, 24Q, 24R, 24S, 24T, 24U, 24V, 24W, 24X. The advanced setting selectors 24 shown in FIG. 3 are sliding bars with a range of 0 to 10. The advanced setting selectors 24 may be any mechanisms allowing the user to assign a weight as an advanced setting for the genre fields 10. Instead of accepting the advanced setting calculated by the weighting calculation using the base settings selected by the user on the base settings screen GUI 12, the user may, optionally, customize a genre field 10 by assigning a weight for that field. The user assigns a weight for a genre field 10 by adjusting the advanced setting selector 24 for that genre field 10.

For example, in FIG. 3, the advanced setting for the Punk field 10Q may have had a weight of 9 as calculated using the weighting calculation based on the base settings. The user did not desire the Punk field 10Q to have a 9 weight setting. The user subsequently changed the weight to '4' for the Punk field 10Q. The user changed the assigned weight by adjusting the advanced setting selector 24Q to '4'.

The advanced settings screen GUI 22 also includes an advanced settings 'Done' button 26. When the user completes the intended assignment of weights for the genre fields 10, or if the user does not want to assign individual weights for any of the genre fields 10 but, instead, accepts the weights as calculated by the weighting calculation, the user actuates the advanced settings 'Done' button 26. Upon actuation of the advanced settings 'Done' button 26, the genre fields 10 with the advanced settings assigned by the user have the weights as assigned. The genre fields 10 which the user did not assign by an advanced setting continue to have the advanced settings as initially shown and retain the weights calculated using the weighting calculation using the base settings.

Optionally, the genre fields 10 with weights individually assigned by the user selecting advanced settings may be visually distinguished in some manner over the genre fields 10 that retain the weights calculated by the weighting calculation using the base settings. The appearance difference, for example, may involve changing the color of the genre field 10. In this manner, the user can immediately determine which genre fields 10 on the advanced settings screen GUI 22 have weights that were assigned by the user or have weights that were calculated by the weighting calculation using the base settings of the subset of genre fields 10.

Figure 4:
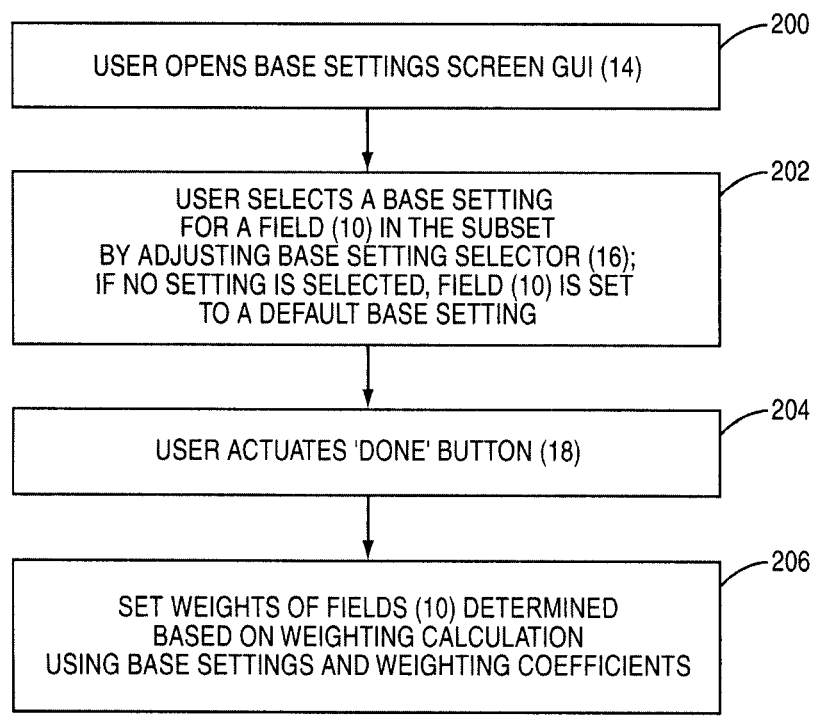
FIG. 4 is a flow chart illustrating the process for the user selecting the base settings of the fields in the subset of the genre media category.

FIG. 4 illustrates the process for a user to select base settings for the genre fields 10 in the subset 14 displayed on base settings screen GUI 12 in FIG. 2. The process allows the user an easy and convenient way to relevantly set the weights for all of the fields in a media category in a fewer number of settings for a given media category without having to assign a weight for each field in the media category.

As illustrated in FIG. 4, the user opens the base settings screen GUI 12 in the media application (step 200). The base settings screen GUI 12 displays the genre fields 10 in the subset 14 each with a base setting selector 16. The particular genre fields 10 in the subset 14 represent fields that may have the most overlapping aspects and attributes to the other fields in the media category. For example, as shown on FIG. 2, the Rock field 10A was included as one of the genre fields 10 in the subset 14. There are aspects or attributes of the Rock field 10A in most or all of the other genre fields 10 in the genre media category. The Folk-Rock field 10I may have a high predominance or prevalence of the attributes and aspects of the Rock field 10A, while the Gospel field 10R may have a low prevalence of the attributes and aspects of the Rock field 10A. The amount or degree of the attributes and aspects of a genre field 10 in the subset 14 that the other genre fields 10 in the media category have is reflected in a weighting coefficient. Additionally, the weighting coefficients also are set to reflect the overall interests, likes, and dislikes of the user.

Once the user has opened the base settings screen GUI 12, the user chooses the genre fields 10 in the subset 14 for which the user desires to select a base setting. The user selects the base setting for genre field 10 in the subset 14 by adjusting the base setting selector 16. If a user does not provide a base setting for a particular genre field 10 in the subset 14, that field is automatically set to a default setting (step 202). In one embodiment, the user may select a base setting for the genre fields 10 in the subset 14 in the range of 0 to 10 with 5 being the midpoint and default setting. The base settings selected by the user allow the user to further adjust the influence that the genre field 10 in the subset 14 has on the set weight of all the genre fields 10 in the media category. In other words, in addition to the weighting coefficient, the base settings represent an influence factor used to determine a set weight of a field in the media category.

Upon completing the selection of the base settings, the user actuates the base settings 'Done' button 18 (step 204). This action indicates to the system that the user has completed the selection of the base settings for the genre fields 10 in the subset 14. The system stores the base settings, which include both user-selected and default settings, until and if the user subsequently opens the base settings screen GUI 12 again and overrides any settings for the genre fields 10 in the subset 14.

The set weights for the genre fields 10 in the media category are determined using a weighting calculation in the preferred embodiment (step 206). The weighting calculation multiplies the weighting coefficient of each genre field 10 within the media category for each of the genre fields 10 in the subset 14 by the base setting for that field in the subset 14. The base setting may be as selected by the user or the default setting.

FIG. 5 illustrates an example of how the weighting calculation 28 for determining the set weights ("W") of the genre fields 10 in the genre media category using weighting coefficients (w) and the base settings (B) may be performed. The weighting calculation is shown in a multiplication matrix form in which a weighting coefficient (w) corresponding to each genre field 10 in the subset 14 is associated with each genre field 10 in the genre media category. As discussed with regard to FIG. 3 above, for ease of explanation and exemplary purposes, only sixteen (16) genre fields 10I-10X are shown in the matrix. As such, weighting coefficient (w) is present for each of the sixteen (16) genre fields 10I-10X corresponding to each genre field 10 in the subset 14. Accordingly, there are 16*8=128 weighting coefficients (w), which are arranged in a 16×8 weighting matrix ($W_m$). The weighting coefficients (w) for a genre field 10 in the genre media category are multiplied by the base settings (B) of the genre fields 10 in the subset 14 to calculate the set weight (W) of that genre field 10. Weighting coefficients (w) may be determined by dividing a relative weighting value by the total of all the weighting values.

As an example, assume that the weighting values for the Folk-Rock field 10I corresponding to each genre field 10 in the subset 14 are as follows:

| Folk-Rock Field | |
| --- | --- |
| Subset Field | Weighting Value |
| Rock | 5 |
| Classical | 0 |
| Folk | 5 |
| Techno | 0 |
| Country | 0 |
| Alternative | 0 |
| Jazz | 0 |
| Funk | 0 |
| Total | 10 |

Similarly, each genre field 10 in the media category has weighting values corresponding to the genre fields 10 in the subset 14.

The weighting coefficient (w) is calculated by dividing the individual weighting value by the Total of the weighting values. Thus, the weighting coefficients (w) for the Folk-Rock field 101 are calculated as follows:
Rock: 5/10=0.50
Classical: 0/10=0
Folk: 5/10=0.50
Techno: 0/10=0
Country: 0/10=0
Alternative: 0/10=0
Jazz: 0/10=0
Funk: 0/10=0

The base settings of the genre fields 10 in the subset 14 as shown on FIG. 2 are listed in the following table.

| Subset Field | Base Setting |
|---|---|
| Rock | 9 |
| Classical | 3 |
| Folk | 6 |
| Techno | 5 |
| Country | 3 |
| Alternative | 5 |
| Jazz | 8 |
| Funk | 7 |

The weighting calculation for a genre field 10 in the media category is the sum of the products of the weighting coefficient (w) times the base setting (B) for all of the genre fields 10 in the subset 14. Thus, the calculation is as follows:

$$W=(Rock(w)*Rock(B))+(Classical(w)*Classical(B))+\\(Folk(w)*Folk(B))+(Techno(w)*Techno(B))+\\(Country\ (w)*Country(B))+(Alternative(w)*\\Alternative(B))+(Jazz\ (w)*Jazz(B))+(Funk(w)*\\Funk(B)).$$

Incorporating the values for the Folk-Rock field 101 in the above calculation, the weighting calculation for the Folk-Rock field 101 is:

$$Folk\text{-}Rock\ 'W'=0.5*9+0*3+0.5*6+0*5+0*3+0*5+\\0*8+0*7=7.5$$

The set weight of the Folk-Rock field 101 as calculated above corresponds to the weight shown on the advanced settings screen GUI 22 for the Folk-Rock field 101 in FIG. 3, above.

Figure 6:
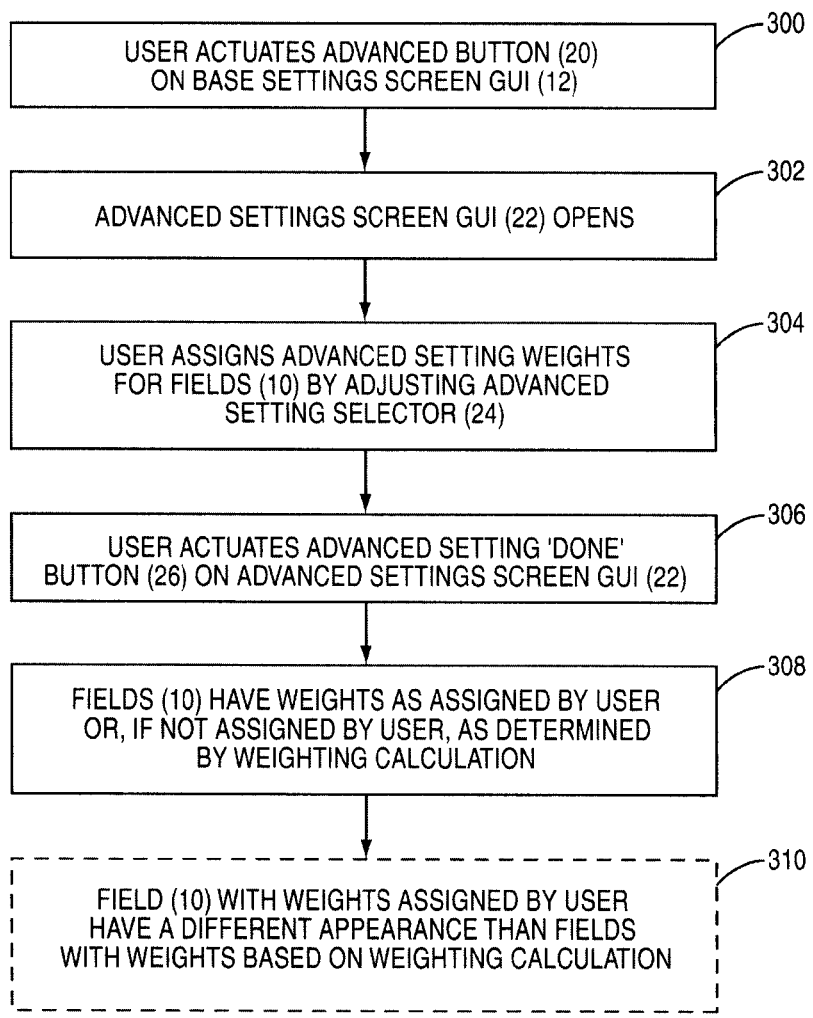
FIG. 6 is a flow chart illustrating the process for the user assigning the weight for the fields in the genre media category as advanced settings.

FIG. 6 illustrates the process for the user to assign the weights for the individual genre fields 10 in the media category displayed on advanced settings screen GUI 22. The process allows the option to assign individual weights for the genre fields 10 and either not have the assigned weights determined by the weighting calculation or override them. Although not shown on FIG. 6, it is assumed that the user has started the media application and the base settings screen GUI 12 is open.

Instead of actuating the base settings 'Done' button 18, the user actuates the 'Advanced' button 20 on the base settings screen GUI 12 to open the advanced settings screen GUI 22 (step 300). By actuating the 'Advanced' button 20, the advanced settings screen GUI 22 opens (step 302). The advanced settings screen GUI 22 displays all of the genre fields 10 in the media category. In this embodiment, the genre fields 10 in the genre media category are displayed. Each genre field 10 has an advanced setting selector 24. The advanced setting selector 24 will indicate the weights selected for that genre field 10. If the user has not previously assigned a weight by adjusting the advanced setting selector 24, the weight setting displayed will be the set weight determined by the weighting calculation using the base settings.

If the user desires to customize the weight of a genre field 10, the user assigns the weight for the genre field 10 by adjusting the advanced setting selector 24 for that genre field 10 (step 304). The advanced settings screen GUI 22 includes an advanced settings 'Done' button 26. When the user completes assigning the weight of the fields he chooses using the advanced setting selector 24, the user actuates the advanced settings 'Done' button 26 (step 306).

Upon actuating the advanced settings 'Done' button 26, the genre fields 10 that have a weight assigned by the user adjusting the advanced setting selector 24 will have the assigned weights as the user assigned. The weights determined using the weighting calculation and based on the base settings are replaced with the assigned weights. The genre fields 10 that the user did not assign the weights by adjusting the advanced setting selector 24 retain the set weights determined by the weighting calculation based on the base settings (step 308). The user then has the flexibility of assigning the weights of certain or all of the genre fields 10 in the media category as the user so desires.

Optionally, once the user actuates the advanced settings 'Done' button 26, the advanced settings screen GUI 22 changes the appearance of the genre fields 10 of which the user directly assigned the weight by adjusting the advanced setting selector 24. The change in the appearance may be a change in color, shading or any other indication to distinguish the set weights determined by the weighting calculations from the assigned weights assigned by the user (step 310). In this manner, the user may easily determine the manner in which the weights of the genre fields 10 were established.

Figure 7:
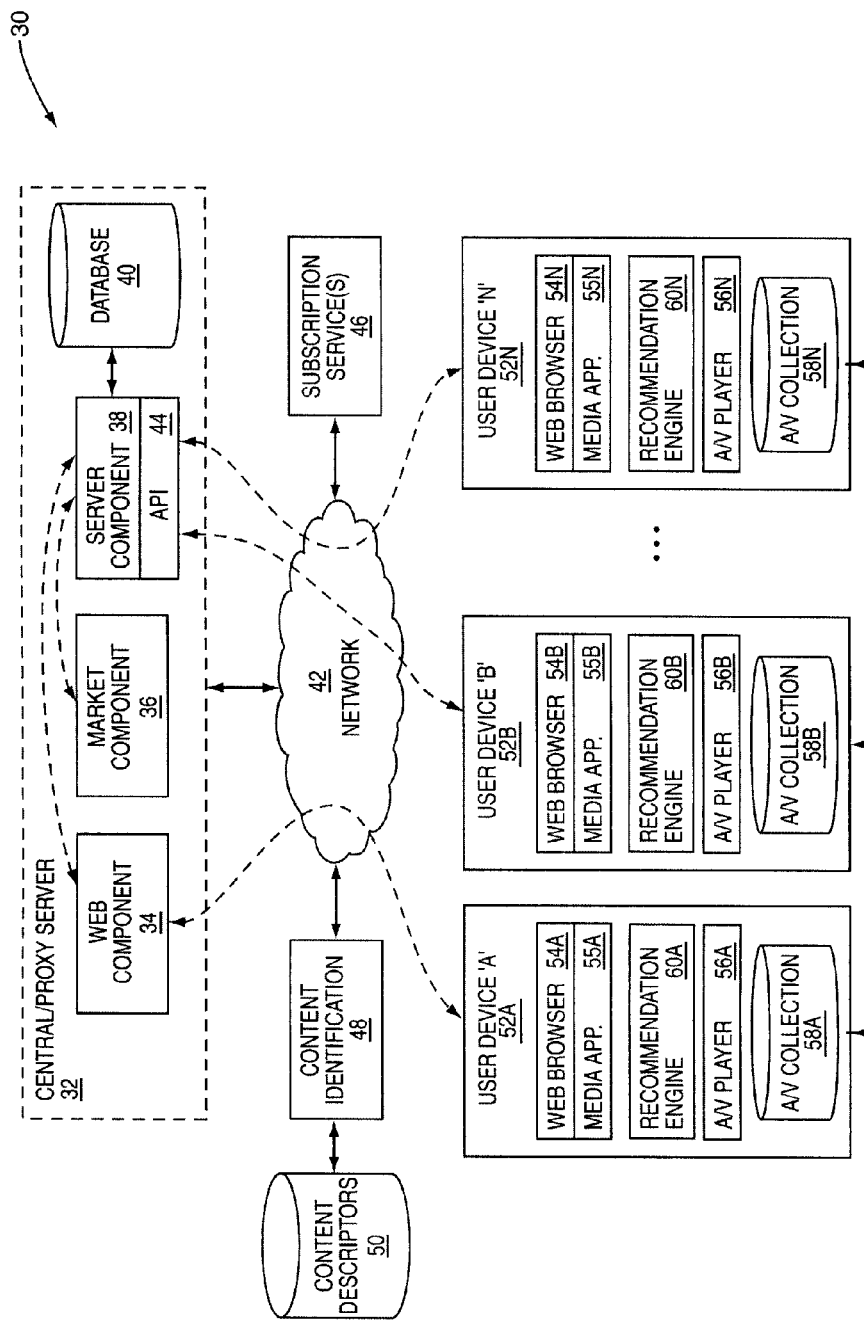
FIG. 7 represents a user-server system on which a user may assign weights for fields in a media category, score media items based on the weights, acquire and send recommendations of media items, and acquire and play media items.

FIG. 7 illustrates a user server system 30 that may employ the present invention for establishing weights for genre fields 10 in a media category using only settings for a subset 14 of genre fields 10 in the media category. Other applications include scoring media items based on the weights, acquiring and sending recommendations of media items, and acquiring and playing media items, for example. The system 30 has a central/proxy server 32 that maintains a record of a user's various media collections. The primary purpose of the server 32 is to manage the flow of information and services provided to users of the system 30, including but not limited to receiving requests for and establishing new user accounts, managing and storing user preferences, storing information about the user's media collections, and managing the flow of recommendations for media items to users. The server 32 operates in a user-server relationship with users, although the present invention may be implemented in a peer-to-peer configuration where features of the server 32 are distributed among one or more peer nodes or devices. The server 32 provides media-based services to the user as long as the user's device is actively connected to the server 32. Note that the server 32 may be implemented as a number of servers operating in a collaborative fashion.

The server 32 may be comprised of several components to facilitate user connections and provide media-related services to the user. These components are illustrated as a web component 34, a market component 36, and a server component 38. The server 32 also contains a database 40 that stores data necessary to support the components 34, 36, 38.

Turning to the components 34, 36, 38, the web component 34 provides users access to registration services and permission to access services provided by the server 32. The web component 34 also provides the media application downloading functionality to devices that interface with the server 32. The media application software is executed on the user's computing devices to login, access, and receive the various media-based services from the server 32. The web component 34 provides Internet communication protocol support for communication to users, registration support, and media application downloading, via an Internet based network 42.

The market component 36 provides downloadable media items to users. The downloaded items may include songs or video, and may be of any format type desired, including but not limited to MP3. The server component 38 contains a web services application programming interface (API) 44 to communicate with external devices over the network 42. The server component 38 also contains data models and recommendation logic that controls the overall services provided by the server 32, such as providing media item recommendations to users based on the user's preferences and/or media collection as will be described in more detail below.

The server 32 is also able to communicate with subscription services 46 for accessing media items for downloading. Some media items requested may not be stored locally in the database 40 of the server 32, but rather obtained from subscription services 46 only when needed or on-demand. Further, the server 32 can communicate over the network 42 with content identification systems 48 to provide identifying and other characteristic information about media items, such as information regarding artists, song titles, genre, etc. in the example of song media content in particular. This allows the server 32 to provide users with user-friendly information about media items as part of the services provided by the server 32. The content identification systems 48 may be coupled with or contain content descriptors 50 that are compared to media items to identify and provide information regarding the media items. For an example with regard to songs in particular, the content descriptors 50 may include known fingerprints and/or Global Unique IDs (GUIDs) to identify songs and obtain metadata containing information about the songs, such as title, artist, genre, etc. A uniform resource locator (URL) may be included to identify location(s) for the descriptor information.

The server 32 is adapted to communicate and connect with multiple user devices 52 to provide services to a user. The user devices 52 may be any type of computing device that is capable of performing communications over the network 42 to reach the server 32 and other user devices 52. The user device 52 may also include a user interface which may include components such as a display, speakers, a user input device, and the like. Examples of user devices 52 include, but are not limited to, home computers; computers at work; laptop computers; wireless portable media player (PMP) devices; hand-held computer devices, such as personal digital assistants (PDA) with remote communication capabilities; and the like. A web browser 54 may be included within each user device 52 to provide the user an interface for Internet-based communications, including those with the server 32.

Each user device 52 that desires to access and receive the services of the server 32 first establishes a user account using a standard web browser 54 or other standard Internet communication interface. This allows the user device 52 to download a media application 55 onto the user device 52 using the web component 34 services of the server 32 to provide a customized software interface to the server 32. After the media application 55 is downloaded onto a user device 52 from the server 32, the media application 55 executes on the user device 52. The user device 52 uses a connection with the web services API 44 to communicate with the market and components 36, 38 of the server 32 to receive media items-based services via the user device 52.

The user device 52 also typically contains an audio/video (N/V) player 56 that allows the user to use or play back any media item desired. Examples of A/V players 56 include but are not limited to Apple® iTunes®, Apple® iPOD®, and the like. Media items selected for use and/or play include those stored locally at the user device 52 in a user's A/V collection 58, and/or any media item accessed from the server 32, another user device, the subscription service(s) 46, and/or any other system accessible by or coupled to the network 42. Media items can also be recommended to other users in response to a user causing its user device 52 to send a recommendation for a media item over the network 42. The recommendation may go to the server 32 and then to the destination user, or the recommendation may be sent directly to the destination user without reaching the server 32.

The user device 52 may also contain a recommendation engine 60. The recommendation engine 60 is a program, algorithm, or control mechanism that handles sending and/or receiving media item recommendations over the network 42. The recommendation engine 60 may also score media items based on user preferences for the different media categories, for example, user, genre, artist, title, album, lyrics, date of release, or the like, and then filter recommendations from the other user devices 52 based on such preferences. In the system 30, the server 32 receives information when the user device 52, and in particular the recommendation engine 60, causes a media item recommendation to be sent to another user and/or when the user device 52 uses or plays a media item that has been recommended from another user.

Figure 8A:
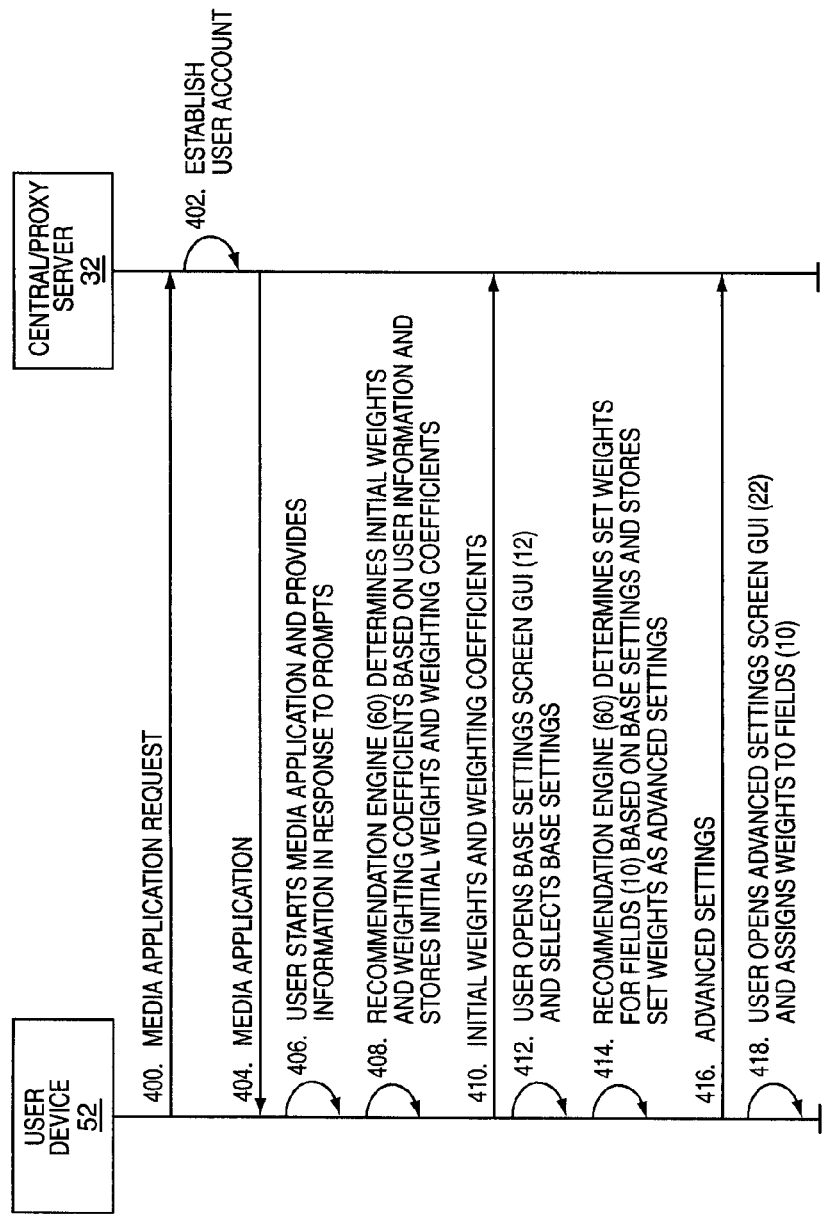
FIGS. 8A and 8B illustrate an exemplary communication flow diagram between a user device and a central/proxy server, wherein the user device receives the media application from the central/proxy server, starts the media application and scores media items and recommendations based on weights calculated and assigned for the fields in the genre media category.
Figure 8B:
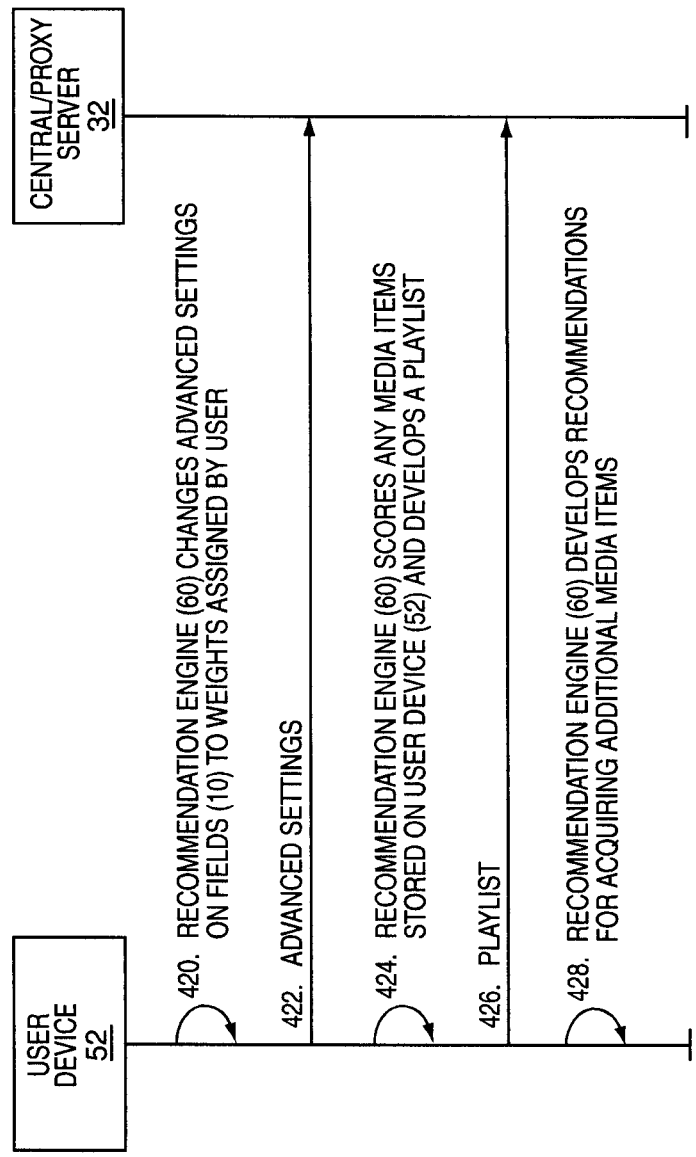

FIGS. 8A and 8B illustrate an exemplary communication flow diagram between the user device 52 and the server 32 illustrated in FIG. 7 to show how the user device 52 receives the media application 55 from the server 32, starts the media application 55 and scores media items and recommendations based on weights calculated and assigned for the genre fields 10 in the genre media category. A media application request is sent from the user device 52 to the server 32 (step 400). The server 32 receives the media application request, establishes a user account (step 402), and sends the media application to the user device 52 (step 404). The user device 52 receives the media application 55 and downloads the media application 55, which executes on the user device 52. The user then starts the media application 55 and provides information in response to prompts (step 406). The recommendation engine 60 determines the initial weights and weighting coefficients based on the information the user provided in response to the prompts, profile or play history and stores the weights and weighting coefficients on the user device 52 (step 408). Optionally, the user device 52 may send the initial weights and weighting coefficients to the server 32 which stores the weights and weighting coefficients (step 410).

The user opens the base settings screen GUI 12 and selects the base settings for the genre fields 10 in the subset 14 (step 412). The recommendation engine 60 determines the set weights of the genre fields 10 using the weighting calculation and stores the set weights on the user device 52 as advanced settings (step 414). Optionally, the recommendation engine may also send the advanced settings to the server 32 (step 416).

The user then has the option of opening the advanced settings screen GUI 22 and assigning the weights for the genre fields 10 in the media category (step 418). If the user does assign the weights, the recommendation engine 60 changes the advanced settings to the weights assigned by the user (FIG. 8B, step 420). The recommendation engine 60 sends the advanced settings, updated to reflect the weights assigned by the user, to the server 32 (step 422).

The recommendation engine 60 scores any media items located on the user device 52 using the advanced settings and develops a playlist (step 424). The recommendation engine 60 may send the playlist to the server 32 (step 426) and develops recommendations for acquiring additional media items (step 428).

FIG. 9 illustrates an exemplary communication flow diagram between the user device 52A, the server 32, the user device 52B and a subscription services 46 to show how media items are determined and recommendations are filtered based on the score resulting from the assigned or set weights of the genre fields 10. The user device 52A may receive a media recommendation from the user device 52B (step 500). The recommendation engine 60A in user device 52A scores and filters the media item recommendations received (step 502). If the media item does not achieve a certain score the recommendation engine 60A may delete the media item recommendation. The recommendation engine 60A updates the playlist with accepted media item recommendations (step 504) and sends the updated playlist to the server 32 (step 506).

The user device 52A may contact one or more of the subscription services 46 to request the purchase of a media item on the playlist that is not stored in the user device 52A (step 508). In response, the subscription service 46 may execute a purchase agreement with the user and send the media item to the user device 52A (step 510). The user device 52A downloads the purchased media items (step 512) and updates the playlist (step 514). The recommendation engine 60A then sends the updated playlist to the server 32 (step 516).

If the user plays a media item (step 518), user device 52A sends a recommendation for that played media item to user device 52B. The recommendation may be sent to the server 32 and then to the user device 52B (steps 520 and 522). Alternatively, the recommendation may be sent by the user device 52A directly to user device 52B (step 524).

FIG. 10 illustrates an exemplary GUI 62 showing a playlist, wherein the recommendation scores for media items based on the weights of the genre fields 10 assigned by a user according to the present invention may be displayed to the user. The GUI 62 displays a list of media items by title 64 shown in FIG. 10 as song titles. Also listed for each media item are different media categories including, the artist 66, genre 68, decade of release 70 and availability 72. The weighting of the different media categories 64, 66, 68, 70, 72 determines the score 74. The score 74 is calculated based on a scoring calculation. An example of a scoring calculation is described in co-pending U.S. patent application Ser. No. 11/484,130 entitled "P2P NETWORK FOR PROVIDING REAL TIME MEDIA RECOMMENDATIONS," referenced above. The list of genres 68 shows the different genre fields 10 that apply to the songs.

Although the embodiments of the present invention are directed to the genre media category, the present invention may be applied to any media category, and, accordingly, the present invention should not be limited in its scope to the genre media category but be understood to apply equally to any other media category.

Those skilled in the art will recognize improvements and modifications to the preferred embodiments of the present invention. All such improvements and modifications are considered within the scope of the concepts disclosed herein and the claims that follow.

What is claimed is:

1. A method of operating a user device to assign user preference settings to fields in a category, comprising the steps of:
   defining a subset of the fields in the category, the subset of the fields in the category being a plurality of the fields in the category;
   establishing a plurality of base settings for the plurality of the fields in the category, each base setting of the plurality of base settings being a base setting for a different one of the plurality of the fields in the subset;
   deriving a plurality of set weights for a plurality of the fields not within the subset as a function of the plurality of base settings, each set weight of the plurality of set weights being a set weight for a different one of the plurality of the fields not within the subset; and
   storing the plurality of base settings for the plurality of the fields in the subset and the plurality of set weights for the plurality of the fields not within the subset as the user preference settings for the fields in the category.

2. The method of claim 1 wherein establishing the plurality of base settings comprises enabling a user of the user device to assign the plurality of base settings for the plurality of the fields within the subset.

3. The method of claim 1 wherein establishing the plurality of base settings comprises setting each of the plurality of base settings for the plurality of the fields not within the subset to a default preference value.

4. The method of claim 1 wherein each of the plurality of base settings is a value within a range of 0 to 10.

5. The method of claim 4 wherein at least one of the plurality of base settings is a default value of 5.

6. The method of claim 1 wherein the plurality of the fields in the subset are fields having attributes that are prevalent in the plurality of the fields that are not within the subset.

7. The method of claim 1 further comprising displaying the plurality of set weights of the plurality of the fields not within the subset to a user.

8. The method of claim 1, further comprising:
   receiving, from a user, an assigned weight for one of the plurality of the fields not within the subset; and
   disregarding the set weight for the one of the plurality of the fields not within the subset and having the assigned weight.

9. The method of claim 8 wherein the assigned weight is within a range of 0 to 10.

10. The method of claim 8, further comprising displaying the one of the plurality of the fields not within the subset and having the assigned weight to the user.

11. The method of claim 10, further comprising differentiating an appearance of the one of the plurality of the fields not within the subset and having the assigned weight from an appearance of fields of the plurality of the fields not within the subset having set weights.

12. The method of claim 8 wherein the assigned weight of the one of the plurality of the fields not within the subset is unaffected by the plurality of base settings.

13. A non-transitory computer-readable medium storing software for assigning user preference settings to fields in a category, the software instructing a processor of a user device to:
   define a subset of the fields in the category, the subset of the fields in the category being a plurality of the fields in the category;
   establish a plurality of base settings for the plurality of the fields in the category, each base setting of the plurality of base settings being a base setting for a different one of the plurality of the fields in the subset;
   derive a plurality of set weights for a plurality of the fields not within the subset as a function of the plurality of base settings, each set weight of the plurality of set weights being a set weight for a different one of the plurality of the fields not within the subset; and
   store the plurality of base settings for the plurality of the fields in the subset and the plurality of set weights for the plurality of the fields not within the subset as the user preference settings for the fields in the category.

14. The non-transitory computer-readable medium of claim 13 wherein the software instructs the processor of the user device to establish the plurality of base settings by enabling a user of the user device to assign the plurality of base settings.

15. The non-transitory computer-readable medium of claim 13 wherein the software instructs the processor of the user device to establish the plurality of base settings by setting each of the plurality of base settings to a default preference value.

16. The non-transitory computer-readable medium of claim 13 wherein the software further instructs the processor of the user device to display the plurality of set weights of the plurality of the fields not within the subset to a user.

17. The non-transitory computer-readable medium of claim 13 wherein the software further instructs the processor of the user device to: receive, from a user, an assigned weight for one of the plurality of the fields not within the subset; and disregard the set weight for the one of the plurality of the fields not within the subset having the assigned weight.

18. The non-transitory computer-readable medium of claim 17 wherein the software further instructs the processor of the user device to display the one of the plurality of the fields not within the subset and having the assigned weight to the user.

19. The non-transitory computer-readable medium of claim 18 wherein the software further instructs the processor of the user device to differentiate an appearance of the one of the plurality of the fields not within the subset and having the assigned weight from an appearance of fields of the plurality of the fields not within the subset having set weights.

20. The non-transitory computer-readable medium of claim 17 wherein the assigned weight of the one of the plurality of the fields not within the subset is unaffected by the plurality of base settings.

21. A non-transitory computer-readable medium storing software for instructing a processor of a user device to display a user interface comprising: a base settings screen, comprising:
   a display of a subset of fields in a category displaying a plurality of the fields in the subset and a plurality of base settings established for the plurality of the fields in the subset, each base setting of the plurality of base settings being a base setting established for a different one of the plurality of the fields in the subset;
   a base setting selector for each field of the plurality of the fields in the subset wherein the base setting selector is actionable to select the base setting for the field, and wherein the base setting selected is displayed on the display; and
   a base settings done button adapted to initiate a determination of a plurality of set weights for a plurality of the fields not within the subset using the plurality of base settings when actuated, each set weight of the plurality of set weights being a set weight for a different one of the plurality of the fields not within the subset.

22. The non-transitory computer-readable medium of claim 21 wherein at least one of the plurality of base settings comprises a preference value selected by a user of the user device for a field of the plurality of the fields in the subset corresponding to the at least one of the plurality of base settings.

23. The non-transitory computer-readable medium of claim 21 wherein the base setting selector is a sliding bar.

24. The non-transitory computer-readable medium of claim 21 further comprising an advanced button.

25. The non-transitory computer-readable medium of claim 24 wherein the advanced button when actuated opens an advanced settings screen.

26. The non-transitory computer-readable medium of claim 25 wherein the user interface further comprises:
   the advanced settings screen, comprising: a display of each field of the plurality of the fields not within the subset having an advanced setting established for the field, wherein the advanced setting is the set weight; and
   an advanced setting selector for each field of the plurality of the fields not within the subset having an advanced setting established for the field, the advanced setting selector actionable to assign the advanced setting to the field, wherein the advanced setting assigned by the advanced setting selector is an assigned weight for the field and wherein the assigned weight replaces the set weight for the field.

27. The non-transitory computer-readable medium of claim 26 wherein the advanced setting selector is a sliding bar.

28. The non-transitory computer-readable medium of claim 26 wherein the advanced settings screen further comprises an advanced settings done button.

29. The non-transitory computer-readable medium of claim 28 wherein the advanced settings done button when actuated establishes advanced settings for the plurality of the fields not within the subset displayed in the advanced settings screen.

30. The non-transitory computer-readable medium of claim 29 wherein an appearance of the display of the field with the assigned weight is different from an appearance of the display of the field with the set weight.

31. The non-transitory computer-readable medium of claim 29 wherein the base setting selector does not affect the advanced setting assigned by the advanced setting selector.

* * * * *